United States Patent
Krishnamurthy et al.

(10) Patent No.: US 9,594,802 B2
(45) Date of Patent: Mar. 14, 2017

(54) GRAPHICAL MODELING OF DATABASE QUERY STATEMENTS

(71) Applicants: Sundaresan Krishnamurthy, Bangalore (IN); Vijayan Balasubramanian, Tamil Nadu (IN)

(72) Inventors: Sundaresan Krishnamurthy, Bangalore (IN); Vijayan Balasubramanian, Tamil Nadu (IN)

(73) Assignee: SAP SE, Walldorf (DE)

( * ) Notice: Subject to any disclaimer, the term of this patent is extended or adjusted under 35 U.S.C. 154(b) by 294 days.

(21) Appl. No.: 14/496,788

(22) Filed: Sep. 25, 2014

(65) Prior Publication Data

US 2016/0092502 A1 Mar. 31, 2016

(51) Int. Cl.
*G06F 17/30* (2006.01)

(52) U.S. Cl.
CPC .. *G06F 17/30398* (2013.01); *G06F 17/30436* (2013.01)

(58) Field of Classification Search
None
See application file for complete search history.

(56) References Cited

U.S. PATENT DOCUMENTS

| | | | | |
|---|---|---|---|---|
| 2007/0002689 A1* | 1/2007 | Mateescu | ............ | G06F 17/3089 367/73 |
| 2010/0241766 A1* | 9/2010 | Bruno | ................. | G06F 11/3664 710/8 |
| 2011/0161342 A1* | 6/2011 | Boskamp | .......... | G06F 17/30418 707/769 |
| 2016/0062870 A1* | 3/2016 | Menahem | ............. | G06F 11/362 717/125 |

* cited by examiner

*Primary Examiner* — Miranda Huang
(74) *Attorney, Agent, or Firm* — Schwegman Lundberg & Woessner, P.A.

(57) ABSTRACT

Example embodiments involve a system, computer-readable storage medium storing at least one program, and computer-implemented method for graphical modeling and editing of database query statements. The method may include accessing a database query statement, and generating an abstract syntax tree (AST) representing a syntactic structure of the database query statement. The method may further include generating a graphical model of the database query statement based on the AST, and rendering the graphical model.

19 Claims, 8 Drawing Sheets

GRAPHICAL MODELING OF DATABASE QUERY STATEMENTS

TECHNICAL FIELD

Example embodiments of the present application generally relate to data processing and, more particularly, to graphical modeling of database query statements.

BACKGROUND

Database query languages are computer-readable languages used in querying, updating, and managing relational databases. Database query languages have been evolving in terms of improved developer productivity and optimization of transparent database access. However, possibly due to the richness of features and constructs, there are several aspects of these languages that are currently underutilized by developers.

The underutilization of these features may be due to developers being unaware of the full set of features supported by the database query languages, or reluctance to modify existing code that may not utilize the language in the most efficient manner due to fear of destabilizing the running code or the effort involved in testing the changes. Another possibility is that the complexity of existing code may prevent developers from arriving at an expected level of understanding needed to optimize query statements appropriately. Yet another possibility is that developers may choose simple yet inefficient queries instead of complex optimally efficient queries. In any event, the net effect is that database-intense applications that are coded with inefficient code continue to perform poorly despite the potential for optimization from a language and infrastructure perspective.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure include a development platform for efficient and optimized development of software that involves database query statements. For purposes of the present disclosure, a "statement" refers to an executable element within a given programming language that expresses an action to be carried out. For example, a statement may be executed to affect data or schemas or to control transactions, program flow, connections, sessions, or diagnostics. A "database query statement" (also referred to simply as a "query") refers to an executable element within a database query language that expresses an action to be carried out with respect to a database.

Example embodiments involve generating and presenting graphical models (e.g., a graphical representation) of database query statements (e.g., OpenSQL queries). The graphical models may be based on database query statements included in source code (e.g., a set of statements or instructions written in a high-level language) or may be created by a developer without the need for writing code. In this way, a developer may easily visualize the functionality and nature of a query and analyze the query for possible improvements and extensions while allowing the developer to embed the modeled query into source code. Further, a developer who may be unfamiliar with the latest features of a database query language will be provided with an easy to understand representation that assists the developer in utilizing these features.

Example embodiments may involve analyzing modeled queries to report errors and to ensure that queries adhere to the best practices in terms of performance. Elements of the modeled queries that are involved in reported errors may be highlighted or otherwise visually distinguished from other elements so as to provide developers with greater insight to assist them to identify potential causes of errors or inefficiencies. In addition, the development platform may provide developers with guided options for fixing reported errors or suggestions for optimizing code so that the developers may quickly and efficiently take action on reported issues.

Figure 1:
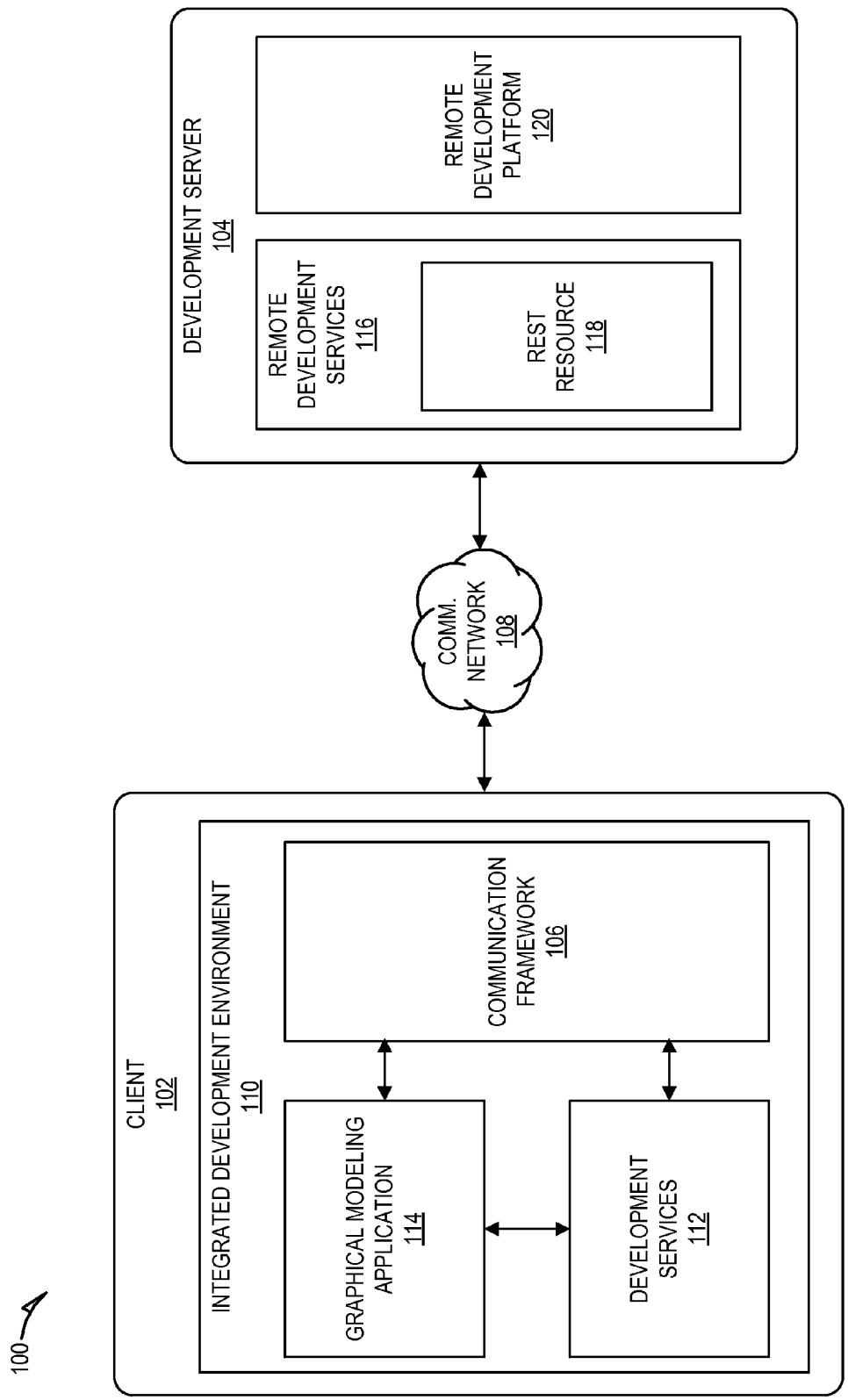
FIG. 1 is an architecture diagram illustrating a networked development platform having a client-server architecture configured for exchanging data over a network, according to an example embodiment.

FIG. 1 is an architecture diagram illustrating a networked development platform 100 having a client-server architecture configured for exchanging data over a network, according to an example embodiment. To avoid obscuring the inventive subject matter with unnecessary detail, various functional components (e.g., modules and engines) that are not germane to conveying an understanding of the inventive subject matter have been omitted from FIG. 1. However, a skilled artisan will readily recognize that various additional functional components may be supported by the networked development platform 100 to facilitate additional functionality that is not specifically described herein.

The networked development platform 100 provides a number of software development services to users (e.g., computer programmers, software developers, and software designers). As shown, the networked development platform 100 may include a client 102 in communication with a development server 104. A communication framework 106 executing on the client 102 may provide a standardized communication layer (e.g., based on the Hypertext Transfer Protocol (HTTP)) to facilitate data exchanges between the client 102 and the development server 104 over a communication network 108.

In some instances, the client 102 and the development server 104 may connect to the communication network 108 via a Wireless Fidelity (Wi-Fi, IEEE 802.11x type) connection, a Worldwide Interoperability for Microwave Access (WiMAX) connection, or another type of wireless data connection. In such an embodiment, the communication network 108 may include one or more wireless access points coupled to a local area network (LAN), a WAN, the Internet, or other packet-switched data network. In other instances, the connection to the communication network 108 may be a wired connection, for example an Ethernet link, and the communication network 108 may be a LAN, a WAN, the Internet, or other packet-switched data network.

As illustrated in FIG. 1, the client 102 may execute an integrated development environment 110, which is a software application that provides features for authoring, modifying, compiling, deploying and developing software. Consistent with some embodiments, the integrated development environment 110 may correspond to the Eclipse® development environment, which may be used to develop software in various different programming languages. The integrated development environment 110 may include a number of development services 112 such as source code editors, debuggers, build automation tools, compilers, and interpreters.

Additionally, the integrated development environment 110 may include a graphical modeling application 114 that provides graphical modeling and editing features for software code. In particular, the graphical modeling application 114 supports rendering of graphical representations of database query statements (e.g., OpenSQL queries) with an option to launch from source objects (e.g., a set of source code) containing the database query statements. Further, the graphical modeling application 114 may support editing existing database query statements for optimization or other changes. The graphical modeling application 114 may also integrate optimization checks for database query statements and may offer suggestions and quick fixes where applicable. Moreover, the graphical modeling application 114 may be utilized to model database query statements from scratch (e.g., in the context of a table or a set of tables) with integration of a data preview. The database query statements edited and modeled using the graphical modeling application 114 may be easily integrated or reintegrated into existing source code.

Consistent with some embodiments, the graphical modeling application 114 may be designed as a plug-in that is integrated with and may be launched from the integrated development environment 110. In these embodiments, the graphical modeling application 114 may be designed to work with a particular modeling infrastructure (e.g., the Graphiti® graphical tooling infrastructure) that employs a particular modeling framework (e.g., Eclipse Modeling Framework (EMF)). Although the graphical modeling application 114 has been discussed and is illustrated as being integrated as part of the integrated development environment 110, it shall be appreciated that, in alternative embodiments, the graphical modeling application 114 may form part of a service that is separate and distinct from the integrated development environment 110.

The client 102 may communicate and exchange data over the communication network 108 with the development server 104 that may pertain to various software development functions and services. For example, the development server 104 may host a number of remote development services 116 that include, but are not limited to, the development services 112 provided by the integrated development environment 110. In some embodiments, the remote development services 116 may supplement or enhance the functionality of the development services 112 by providing additional features that are not natively supported by the integrated development environment 110.

The remote development services 116 may further include a Representational State Transfer (REST) resource 118 to expose the client 102 to functionality provided by the remote development platform 120. Particularly, the remote development platform 120 may support generation of an abstract syntax tree (AST), which is a data structure representing the syntactic structure of software code, for database query statements. The ASTs generated by the remote development platform 120 may conform to a specific modeling framework such as EMF. The remote development platform 120 may further provide syntax checking and validation services for database query statements.

While the networked development platform 100 shown in FIG. 1 employs client-server architecture, the present inventive subject matter is, of course, not limited to such an architecture, and could equally well find application in an event-driven, distributed, or peer-to-peer architecture system, for example. Further, the various functional components of the integrated development environment 110 may be implemented as standalone systems or software programs, which do not necessarily have networking capabilities. Moreover, it shall be appreciated that although the various functional components of the networked development platform 100 are discussed in the singular sense, multiple instances of one or more of the various functional components may be employed.

Figure 2:
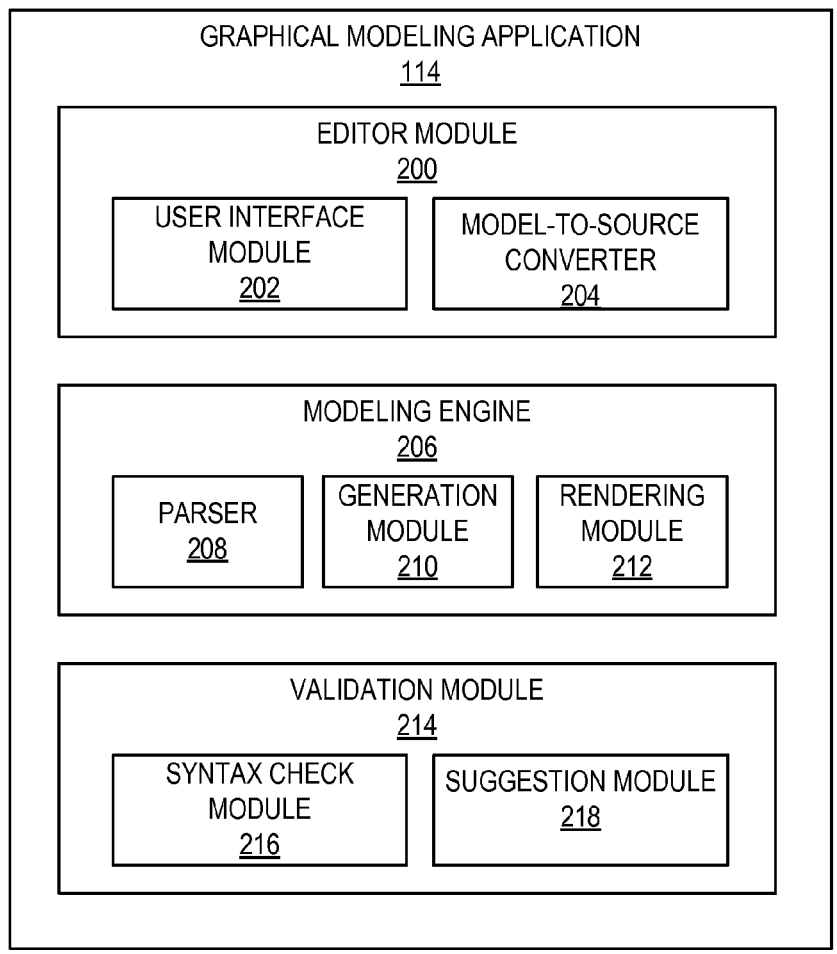
FIG. 2 is a block diagram illustrating various functional components of the graphical modeling application and the remote development platform, which are provided as part of the networked development platform, according to an example embodiment.
Figure 2:
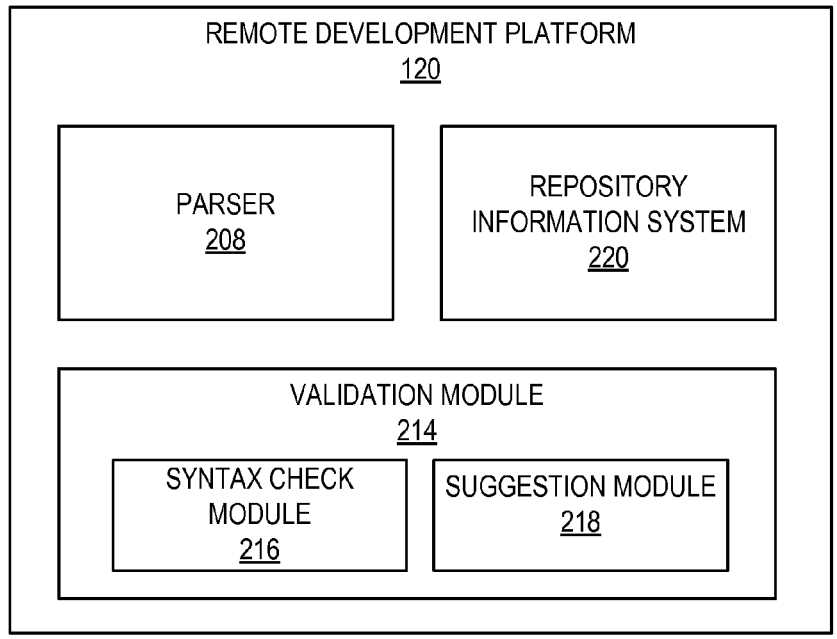

FIG. 2 is a block diagram illustrating various functional components of graphical modeling application 114 and the remote development platform 120, which are provided as part of the networked development platform 100, according to an example embodiment. As is understood by skilled artisans in the relevant computer and Internet-related arts, each component (e.g., a module or engine) illustrated in FIG. 2 represents a set of executable software instructions and the corresponding hardware (e.g., memory and processor) for executing the instructions.

Figure 3:
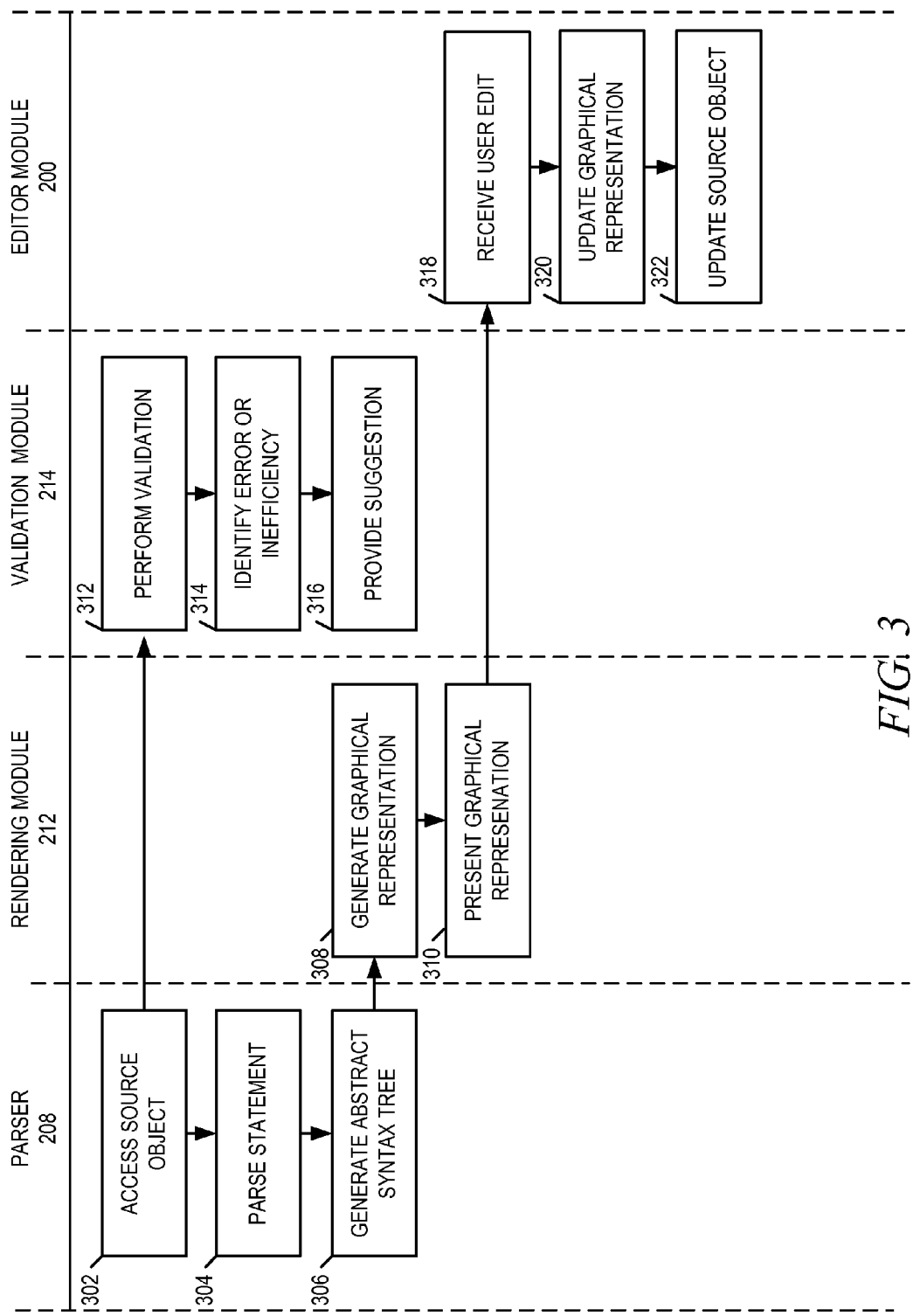
FIG. 3 is an interaction diagram illustrating exchanges between the various functional components of the graphical modeling engine, according to an example embodiment.

As shown, the graphical modeling application 114 includes an editor module 200 comprising a user interface module 202 and a model-to-source converter 204, a modeling engine 206 comprising a parser 208, a generation module 210, and a rendering module 212, and a validation module 214 comprising a syntax check module 216 and a suggestion module 218, all configured to communicate with each other (e.g., via a bus, shared memory, a switch, or application programming interfaces (APIs)). The remote development platform 120 is shown as including the parser 208, a repository information system 220, and the validation module 214, all configured to communicate with each other (e.g., via a bus, shared memory, a switch, or APIs). The various functional components of the graphical modeling application 114 and the remote development platform 120 may reside on a single computer (e.g., a server), or may be distributed across several computers in various arrangements. The various components of the graphical modeling application 114 and the remote development platform 120 may, furthermore, access one or more databases, and each of the various components of the graphical modeling application 114 and the remote development platform 120 may be in communication with one another. Further, while the components of FIG. 3 are discussed in the singular sense, it will be appreciated that in other embodiments multiple instances of the components may be employed.

The editor module 200 supports editing of database query statements and graphical models representing database query statements. The user interface module 202 is responsible for facilitating user edits to the graphical models, and to this end, the user interface module 202 may provide a number of interfaces (e.g., cause presentation of interfaces on the client 102) for receiving user input indicative of a change to a graphical model. The interfaces provided by the user interface module 202 may, for example, include any combination of buttons, icons, tooltips, menus or tool bars having selectable elements that, when selected (e.g., via mouse click) may invoke functionality that allows the user to adjust, modify or otherwise interact with a graphical model. The user edits may, for example, include adding an element to a graphical model, removing an element from a graphical model, or editing attributes of an element of a graphical model (e.g., editing a column list). The interfaces provided by the user interface module 202 may enable further interactions with graphical model elements such as collapsing elements into a condensed view, resizing elements, moving elements, and auto-configuration of model elements. The user interface module 202 also supports defining "where" conditions, "join" conditions, and the like using intuitive graphical controls.

The model-to-source converter 204 is responsible for converting graphical models to a corresponding database query statement, and translating edits to a graphical model to a corresponding database query statement. To this end, the model-to-source converter 204 may analyze graphical models in an Extensible Markup Language (XML) format to generate a corresponding database query statement. In instances in which the model-to-source converter 204 translates a user edit to an existing graphical model launched from a source object to an appropriate database query statement, the model-to-source converter 204 may further inject the database query statement into the appropriate position in the source code.

The modeling engine 206 is responsible for generating and rendering graphical models of database query statements. The graphical models are graphical representations of the database query statement that may aid users (e.g., software developers) in understanding the complexities and nuances of database query statements. The parser 208, which, in some embodiments, forms part of the modeling engine 206, may access a database query statement (e.g., included as part of a source object) and parse it to determine the syntactic structure of the statement. Upon determining the syntactic structure of the database query statement, the parser 208 may generate the corresponding AST.

In some embodiments, the parser 208 may modify the AST with additional attributes to generate a domain model to be used in generating a graphical model. In these embodiments, the parser 208 may retrieve information from the repository information system 220 to enrich the AST to generate the domain model. The domain model may be an XML-based model that describes elements of the database query statement and their attributes as well as their roles and relationships with other elements. The domain model may be generated such that it conforms to a specific modeling framework such as EMF.

The generation module 210 may use the domain model generated by the parser (e.g., based on the AST of the database query statement) to generate the graphical model of the database query statement. Consistent with some embodiments, the graphical model may include a set of Java classes and a set of adapter classes that enable viewing and command-based editing of the graphical model supported by the editor module 200. The generation module 210 may employ object type metadata to enhance the graphical model with additional content such as database tables and a list of columns that are included in the tables.

The rendering module 212 is responsible for the presentation of graphical models. To this end, the rendering module 212 may provide instructions to the client 102 that cause the client 102 to present a graphical model on a display coupled to the client 102. The rendering module 212 may utilize the object type metadata to display applicable tables, their columns, and column names.

The validation module 214 is responsible for verifying the validity of database query statements. In particular, the validation module 214 is responsible for validating the syntax of database query statements. To this end, the validation module 214 includes a syntax check module 216 configured to perform syntax validations of database query statements, and in doing so, identify errors and inefficiencies in the database query statements. In instances in which the syntax check module 216 successfully validates the syntax of a database query statement, the syntax check module 216 may cause the presentation of a notification or alert that indicates that the syntax of the database query statement is valid. The syntax check module 216 may, for example, utilize a standard ABAP syntax check framework for supporting validation of OpenSQL queries, consistent with some embodiments. In this manner, the syntax check module 216 may support both past and future versions of the OpenSQL language.

In addition to supporting syntax validation of database query statements, the validation module 214 also includes the suggestion module 218, which is configured to provide suggestions based on the result of the validation check performed by the syntax check module 216. In instances in which the syntax check module 216 identifies an error in the syntax of a database query statement, the suggestion module 218 may provide (e.g., cause display of) instructions to fix the error. In instances in which the syntax check module 216 module identifies an inefficiency (e.g., use of old syntax) in a database query statement, the suggestion module 218 may provide (e.g., cause display of) one or more suggestions that instruct a user how to optimize or otherwise improve the database query statement. In both instances (e.g., an error or an inefficiency is identified), the suggestion module 218 may work in conjunction with the rendering module 212 to highlight or otherwise visually distinguish elements of a corresponding graphical model that are associated with the error or inefficiency. Further, the suggestion module 218 may also provide "quick fix" options whereby errors or inefficiencies may be automatically corrected by the validation module 214 in response to receiving user approval (e.g., selection of a button indicating approval of the suggested fix)

Although the parser 208 and validation module 214 are illustrated in FIG. 2 to be included as part of both the graphical modeling application 114 executing on the client 102, and the remote development platform 120 executing on the development server 104, it shall be appreciated that, in other embodiments, either the parser 208 or validation module 214 may be included in only one of the graphical modeling application 114 and the remote development platform 120. Further, in some embodiments, the operations respectively performed by the parser 208 and validation module 214 may be performed in whole or in part on either the client 102 or the development server 104. Moreover, in some embodiments, certain operations may be performed by the development server 104 to support operations of the graphical modeling application 114 executing on the client 102. For example, in some embodiments, an EMF conforming model is defined on the client 102 (e.g., by the modeling engine 206) to which the AST generated by the parser 208 of the remote development platform 120 is mapped to generated the domain model. In this way, the AST generation would support database query language grammar versions across different releases.

FIG. 3 is an interaction diagram illustrating exchanges between the various functional components of the networked development platform 100, according to an example embodiment. As shown, the process begins at operation 302 where the parser 208 accesses a source object (e.g., a set of instructions) containing a database query statement (e.g., an OpenSQL query). At operation 304, the parser 208 parses the database query statement, and analyzes the parsed database query statement to generate an AST, which is a data structure representing the syntactic structure of the database query statement. The AST generated by the parser 208 may, for example, be an extensible markup language (XML) file.

At operation 308, the rendering module 212 uses the AST generated by the parser 208 to generate a graphical model (e.g., a graphical representation) of the database query statement. In some embodiments, the generation of the graphical model may include modifying the AST to include a number of additional attributes that aid in generating the graphical model. The modification of the AST may be such that the AST may be used by the rendering module 212 as a domain model. The domain model may be an object model that describes entities and their attributes as well as their roles and relationships with other entities. In some embodiments, the domain model, which is created by enriching the AST with additional attributes, may conform to a particular model framework that may be employed by the rendering module 212. For example, the rendering module 212 may employ the Eclipse Modeling Framework (EMF), and the AST may be modified such that it conforms to the EMF.

Figure 4A:
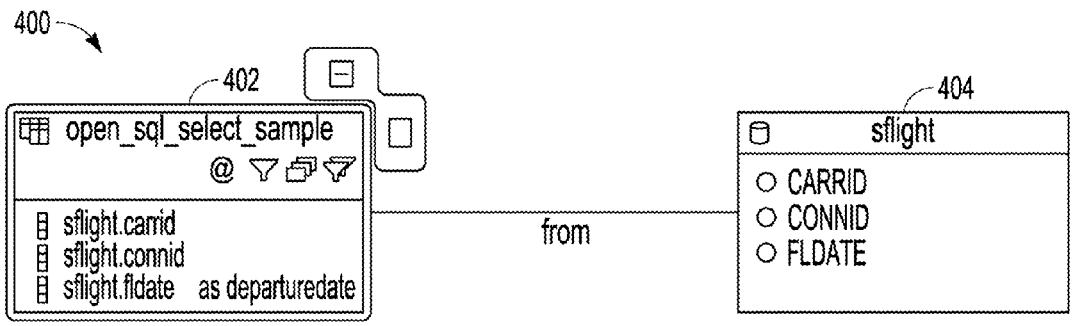
FIGS. 4A-C are interface diagrams illustrating graphical representations of database query statements, according to example embodiments.

At operation 310, the rendering module 212 causes the graphical model to be presented on the client 102. As an example, FIG. 4A is an interface diagram illustrating a graphical model 400 of a database query statement, according to example embodiments. In particular, the graphical model 400 is a graphical representation of an instruction to retrieve data from a particular source (e.g., a "select" statement). Specifically, the graphical model 400 is a graphical representation of the following database query statement, which, in this example, is an OpenSQL query:

SELECT carrid connid Mate as departuredate from SFLIGHT . . . .

As shown, the graphical model 400 includes an element 402 corresponding to the source of the data to be retrieved (e.g., "SFLIGHT"), and an element 404 corresponding to the data that is retrieved (e.g., "carrid," "connid," "fldate," and "departuredate").

Figure 4B:
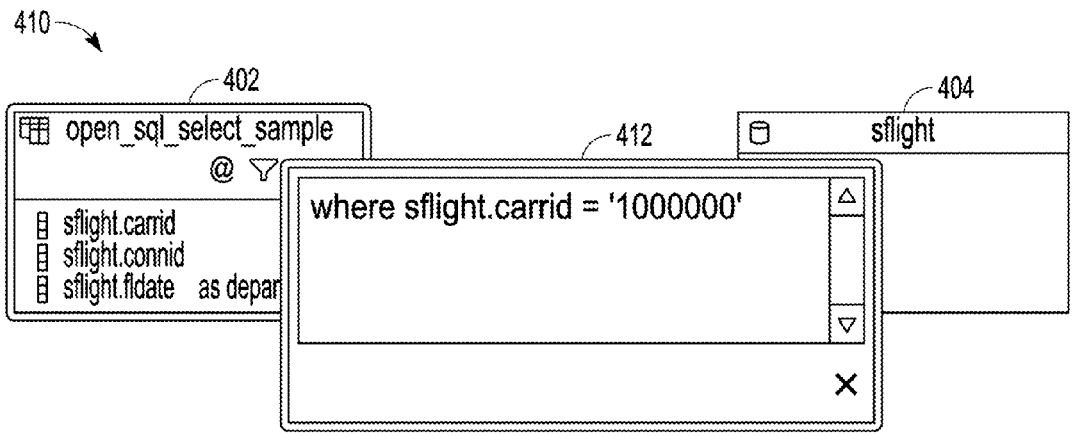

As another example, FIG. 4B is an interface diagram illustrating a graphical model 410 of another database query statement, according to example embodiments. In particular, the graphical model 410 is a graphical representation of the following database query statement, which, in this example, is an OpenSQL query:

SELECT carrid connid fldate as departuredate from SFLIGHT where carrid='10000000'

As shown, in addition to the elements 402 and 404 discussed in reference to FIG. 4A, the graphical model 410 includes an element 412 that corresponds to the "where" clause of the example database query statement, which includes a comparison predicate to restrict the rows returned by the query (e.g., carrid='10000000').

Figure 4C:
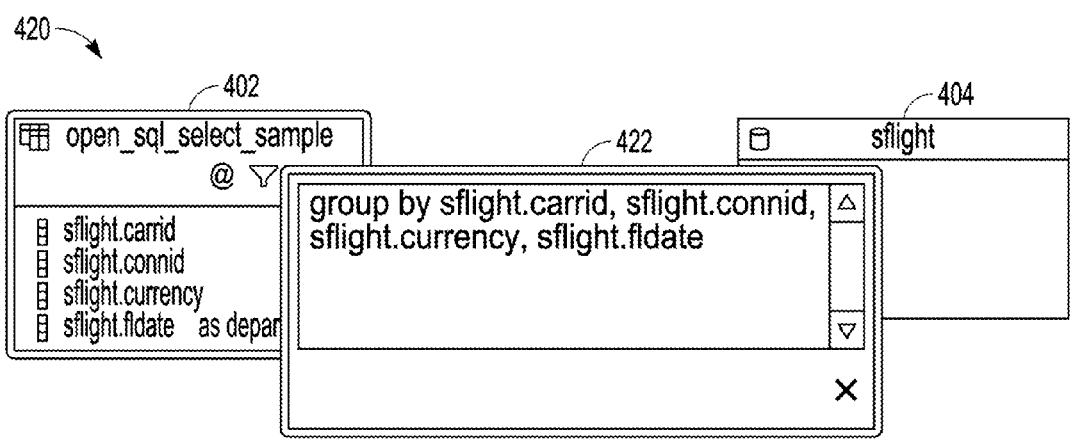

As yet another example, FIG. 4C is an interface diagram illustrating a graphical model 420 of yet another database query statement, according to example embodiments. In particular, the graphical model 420 is a graphical representation of the following database query statement, which, in this example, is an OpenSQL query:

SELECT carrid connid currency Mate as depaturedate from sflight where carrid='1000000' group by carrid connid currency Mate.

As shown, in addition to the elements 402 and 404 discussed in reference to FIG. 4A, the graphical model 420 includes an element 422 that corresponds to the "group by" clause of the example database query statement, which is used to project rows having common values into a smaller set of rows.

Returning back to FIG. 3, at operation 312, which may occur in parallel with or subsequent to operations 304-310, the validation module 214 performs a validation (e.g., syntax validation) of the database query statement. At operation 314, the validation module 214 may identify an error or inefficiency in the database query statement. In response to identifying the error or inefficiency, the validation module 214 may provide one or more suggestions, at operation 316, to a user of the client 102 (e.g., cause presentation of the one or more suggestions). In instances in which the validation module 214 identifies an error, the one or more suggestions provided by the validation module 214 may include instructions or recommendations for fixing the error. In instances in which the validation module 214 identifies a syntactic inefficiency, the one or more suggestions provided by the validation module 214 may include instructions or recommendations for optimizing or otherwise improving the database query statement.

At operation 318, the editor module 200 receives a user edit to the graphical model presented on the client 102. The user edit may correspond to an element being added, edited or deleted, and may be accomplished by manipulation of the graphical model using a mouse cursor or other input device (e.g., a touch screen). At operation 320, the editor module 200 may work in conjunction with the rendering module 212 to update the graphical model of the database query statement in accordance with the received user edit. At operation 322, the editor module 200 updates the source object to reflect changes to the database query statement corresponding to the user edit to the graphical model representing the database query statement. Consistent with some embodiments, the updating of the source object may include translating the graphical model to an XML model, converting the XML model to an updated database query statement (e.g., an OpenSQL query), and injecting the updated database query statement into the source object in place of the original database query statement.

Figure 5:
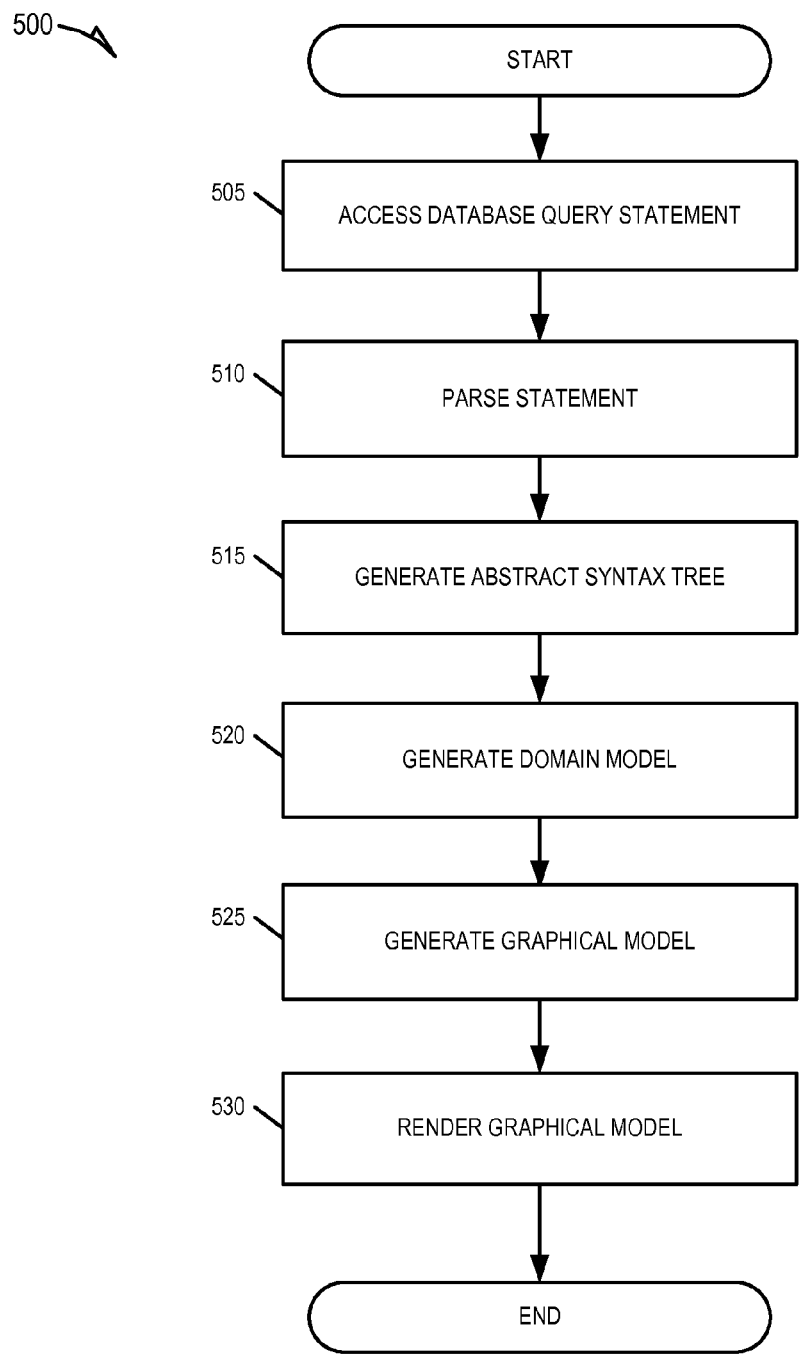
FIG. 5 is a flow chart illustrating a method for providing a graphical representation of a database query statement, according to an example embodiment.

FIG. 5 is a flow chart illustrating a method 500 for providing a graphical representation of a database query statement, according to an example embodiment. The method 500 may be embodied in computer-readable instructions for execution by one or more processors such that the steps of the method 500 may be performed in part or in whole by the components of the integrated development environment 110 or remote development platform 120; accordingly, the method 500 is described below by way of example with reference thereto. However, it shall be appreciated that the method 500 may be deployed on various other hardware configurations and is not intended to be limited to the integrated development environment 110 or the remote development platform 120.

At operation 505, the parser 208 may access a database query statement. The database query statement may be included in source code, and may be accessed in response to a user request to use the graphical modeling application 114 to view and edit a graphical model of the database query statement. In some embodiments, the user may provide such a request from within a source code editor that is part of the development services 112 offered by the integrated development environment 110.

At operation 510, the parser 208 parses the database query statement (e.g., an OpenSQL statement). At operation 515, the parser 208 uses the parsed statement to generate the AST for the database query statement, which is a data structure representing the syntactic structure of the database query statement. In an example of operations 505-515, the parser 208 may access the OpenSQL statement included in Table 1, and upon parsing and analyzing the statement, generate the XML based AST included in Table 2. Consistent with some embodiments, the AST may evolve depending on the grammar or syntax used in the OpenSQL statement.

TABLE 1

```
SELECT
    node_key AS invoice_guid,
    created_at AS created_at,
    changed_at AS changed_at,
    buyer_guid as buyer
FROM
    snwd_so_inv_head
INTO TABLE @et_invoice_header
WHERE payment_status = 'P'
AND changed_at BETWEEN @lv_parameter_date_min AND
@lv_parameter_date_max.
```

TABLE 2

```
<Select prp="S">
 <SelectList>
  <SelectListEntry>
   <Id prp="I">
    <Comp>NODE_KEY</Comp>
   </Id>
   <As>
    <IdDef prp="I">INVOICE_GUID</IdDef>
   </As>
  </SelectListEntry>
  <SelectListEntry>
   <Id prp="I">
    <Comp>CREATED_AT</Comp>
   </Id>
   <As>
    <IdDef prp="I">CREATED_AT</IdDef>
   </As>
  </SelectListEntry>
  <SelectListEntry>
   <Id prp="I">
    <Comp>CHANGED_AT</Comp>
   </Id>
   <As>
    <IdDef prp="I">CHANGED_AT</IdDef>
   </As>
```

TABLE 2-continued

```
  </SelectListEntry>
  <SelectListEntry>
   <Id prp="I">
    <Comp>BUYER_GUID</Comp>
   </Id>
   <As>
    <IdDef prp="I">BUYER</IdDef>
   </As>
  </SelectListEntry>
 </SelectList>
 <FromClause>
  <DBTable>
   <Id prp="I">SNWD_SO_INV_HEAD</Id>
  </DBTable>
 </FromClause>
 <IntoClause>
  <IntoTable>
   <Id prp="IW">ET_INVOICE_HEADER</Id>
  </IntoTable>
 </IntoClause>
 <WhereClause>
  <LogAnd>
   <LogRel>
    <Id prp="I">
     <Comp>PAYMENT_STATUS</Comp>
    </Id>
    <Op>=</Op>
    <LitC>'P'</LitC>
   </LogRel>
   <LogRel>
    <Id prp="I">
     <Comp>CHANGED_AT</Comp>
    </Id>
    <Op>BETWEEN</Op>
    <Id prp="I">LV_PARAMETER_DATE_MIN</Id>
    <Id prp="I">LV_PARAMETER_DATE_MAX</Id>
   </LogRel>
  </LogAnd>
 </WhereClause>
</Select>
```

At operation 520, the generation module 210 generates a domain model for the database query statement using the AST. In some embodiments, the generation of the domain model may include translating or mapping the AST to a preexisting model framework used for generating the graphical model. For example, the generation of the domain model may include enriching the AST with additional attributes so that it conforms to a particular modeling framework (e.g., EMF).

At operation 525, the generation module 210 generates a graphical model (e.g., a graphical representation) of the database query statement using the domain model. At operation 530, the rendering module 212 renders the graphical model. The rendering of the graphical model may include causing the presentation of the graphical model on a display of the client 102, or on the display of an additional device communicatively coupled to the networked development platform 100. Example graphical models of example database query statements are illustrated in FIG. 4A-C.

Figure 6:
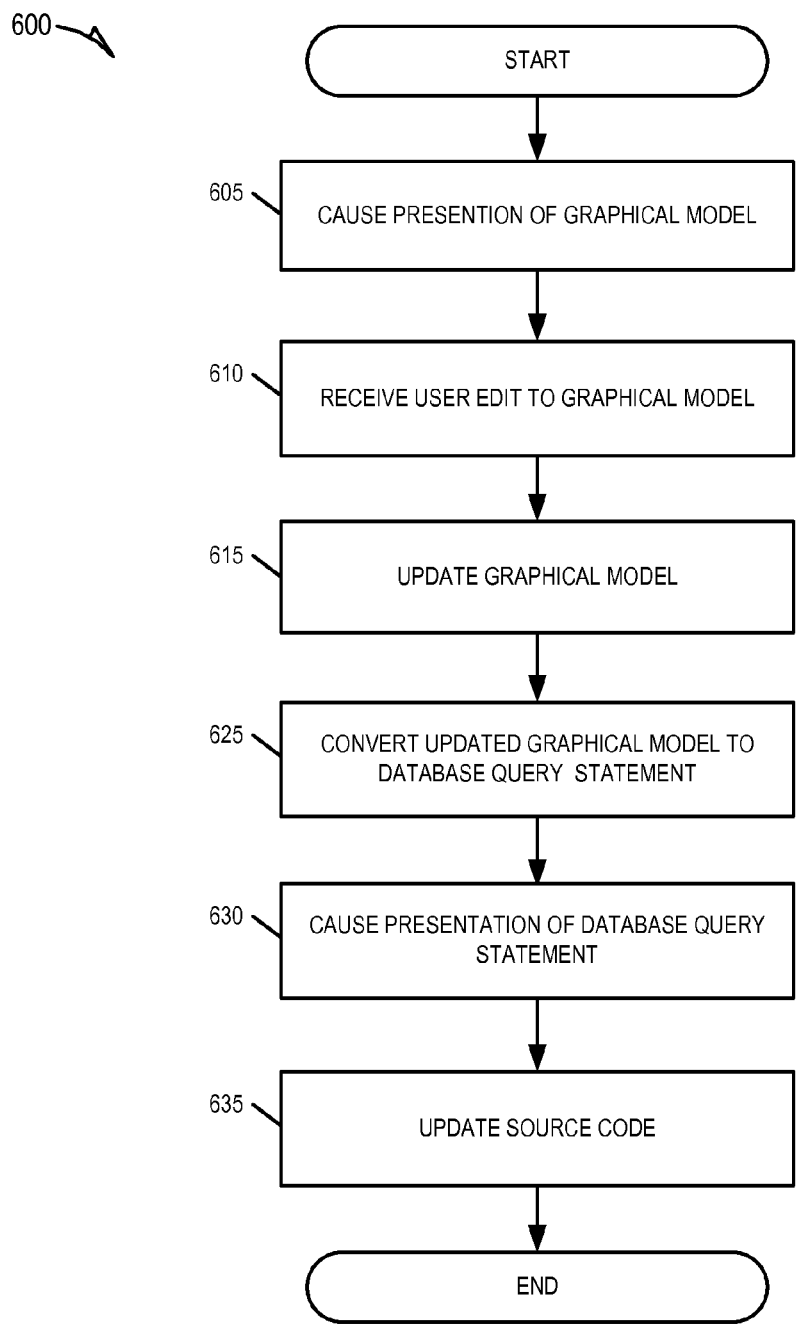
FIG. 6 is a flow chart illustrating a method for editing a graphical representation of a database query statement, according to an example embodiment.

FIG. 6 is a flow chart illustrating a method 600 for editing a graphical representation of a database query statement, according to an example embodiment. The method 600 may be embodied in computer-readable instructions for execution by one or more processors such that the steps of the method 600 may be performed in part or in whole by the graphical modeling application 114, and accordingly, the method 600 is described below by way of example with reference thereto. However, it shall be appreciated that the method 600 may be deployed on various other configurations and is not intended to be limited to the graphical modeling application 114.

At operation 605, the rendering module 212 causes presentation of a graphical model representing a database query statement. The graphical model may be presented on a display of the client 102. The database query statement may be included in a source object (e.g., source code), and the graphical model may be presented in response to a user request for such. In some embodiments, the user may request the presentation of the graphical model from a source editor of the development services 112 provided by the integrated development environment 110.

At operation 610, the user interface module 202 of the editor module 200 may receive a user edit to the graphical model (e.g., user input indicative of an edit to the graphical model) via mouse cursor or other such input device of the client 102. The user edit may include adding, deleting, or modifying an element of the graphical model. For example, a user may edit a column list included in an element of the graphical model.

At operation 615, the editor module 200 updates the graphical model according to the received user edit. At operation 625, the model-to-source converter 204 analyzes the updated graphical model and converts it to a corresponding database query statement (e.g., OpenSQL statement). At operation 630, the user interface module 202 causes presentation of the database query statement generated in response to the user edit. In this manner, the user may be provided with a preview of the effect that the edit may have on the underlying source code. At operation 635, the model-to-source converter 204 updates the source code by replacing the database query statement corresponding to the graphical model presented at operation 605, with the updated database query statement that is based on the received user edit.

Figure 7:
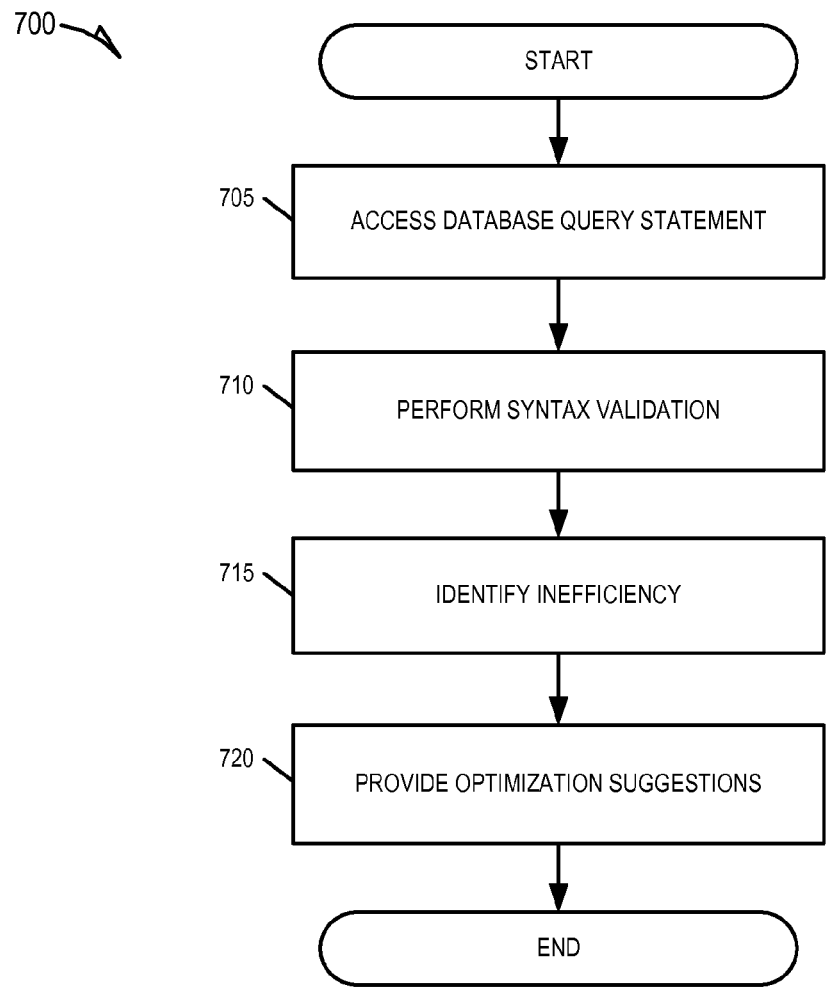
FIG. 7 is a flow chart illustrating a method for providing optimization suggestions for a database query statement, according to an example embodiment.

FIG. 7 is a flow chart illustrating a method 700 for providing optimization suggestions for a database query statement, according to an example embodiment. The method 700 may be embodied in computer-readable instructions for execution by one or more processors such that the steps of the method 700 may be performed in part or in whole by the integrated development environment 110 or the development infrastructure platform 120, and accordingly, the method 700 is described below by way of example with reference thereto. However, it shall be appreciated that the method 700 may be deployed on various other configurations and is not intended to be limited to the integrated development environment 110 or the development infrastructure platform 120.

At operation 705, the validation module 214 accesses a database query statement. The database query statement may be accessed from a source object provided by a user, or from a preexisting graphical model. At operation 710, the syntax check module 216 performs a syntax validation to determine whether the syntax of the database query statement is correct. The validity of the syntax, of course, depends on the specific programming language being utilized.

During the validation process, the syntax check module 216 may identify an inefficiency or error in the syntax of the database query statement, which occurs at operation 715. For example, the syntax check module 216 may identify use of certain syntax that, while still valid, has been superseded by an updated syntax or coding feature that, if utilized, would optimize the performance of the database query statement. As another example, the syntax check module 216 may identify a set of elements used in the database query statement that may be replaced with a single element to increase efficiency.

At operation 720, the suggestion module 218 provides an optimization suggestion based on the identified inefficiency or error. The providing of optimization suggestions may include causing presentation of textual instructions (e.g., in a separate window) for improving an inefficiency or fixing an error. In instances in which a graphical model has been generated for the database query statement, the providing of the optimization suggestions may further include visually distinguishing (e.g., highlighting) model elements associated with the inefficiency from the remaining model elements so as to provide an additional aid to the user in improving the functionality of the underlying code. In some embodiments, the suggestion module 218 may also provide "quick-fix" options to the user whereby the suggestion module 218 suggests a change to improve the code, and automatically implements the change in response to receiving user approval (e.g., via GUI element such as a button or dialog box).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Machine Architecture

Figure 8:
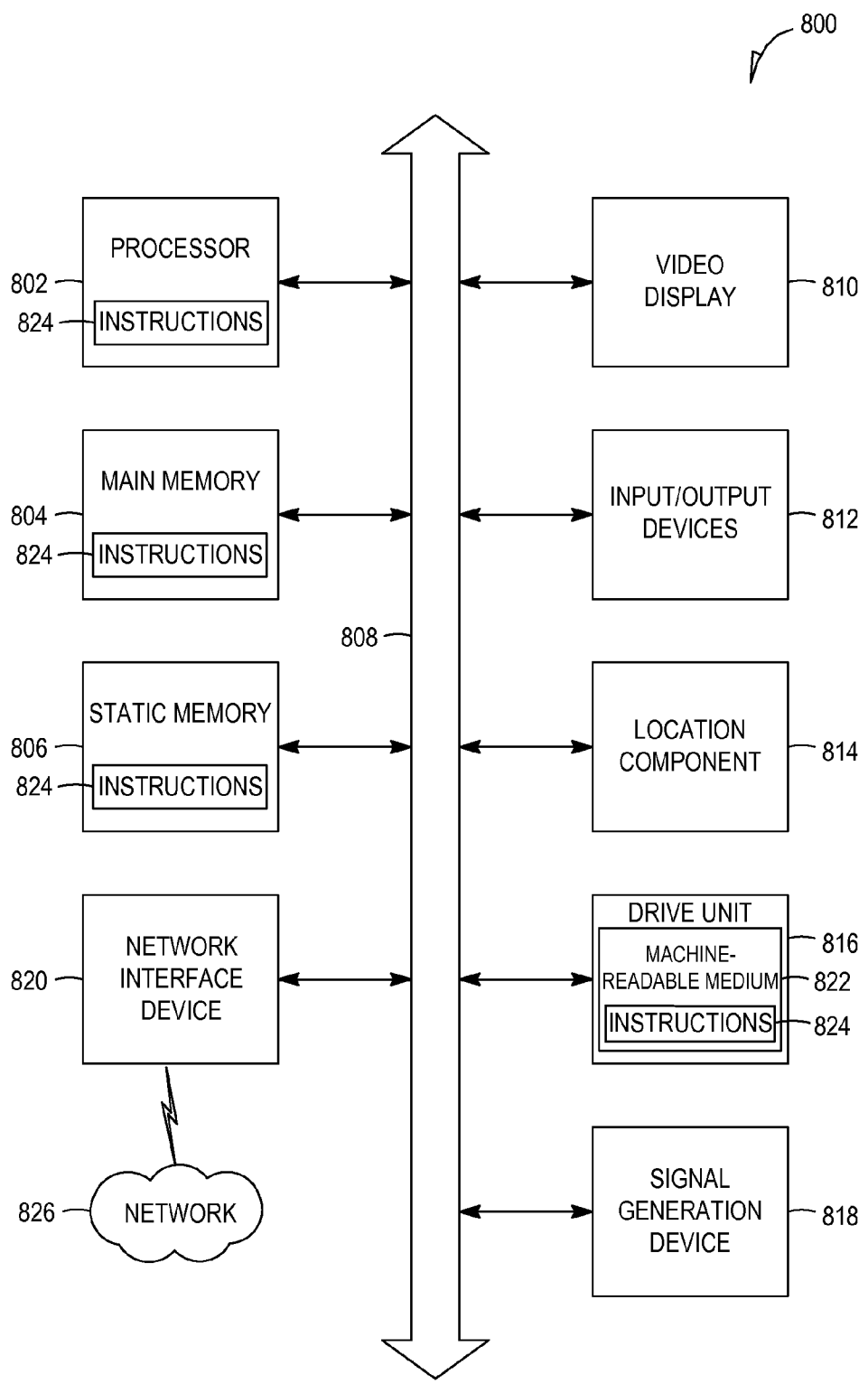
FIG. 8 is a diagrammatic representation of a machine in the example form of a computer system within which a set of instructions for causing the machine to perform any one or more of the methodologies discussed herein may be executed.

FIG. 8 is a diagrammatic representation of a machine in the example form of a computer system 800 within which a set of instructions for causing the machine to perform any one or more of the methodologies discussed herein may be executed. The computer system 800 may correspond to either of the client 102 and the development server 104, consistent with some embodiments. The computer system 800 may include instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine may, for example, be a personal computer (PC), a PDA, a cellular telephone, a smart phone (e.g., iPhone®), a tablet computer, a web appliance, a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, a video game system console, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display 810 (e.g., a liquid crystal display (LCD) or a cathode ray tube (CRT)). The computer system 800 also includes one or more input/output (I/O) devices 812, a location component 814, a drive unit 816, a signal generation device 818 (e.g., a speaker), and a network interface device 820. The I/O devices 812 may, for example, include a keyboard, a mouse, a keypad, a multi-touch surface (e.g., a touchscreen or track pad), a microphone, a camera, and the like.

The location component 814 may be used for determining a location of the computer system 800. In some embodiments, the location component 814 may correspond to a GPS transceiver that may make use of the network interface device 820 to communicate GPS signals with a GPS satellite. The location component 814 may also be configured to determine a location of the computer system 800 by using an internet protocol (IP) address lookup or by triangulating a position based on nearby mobile communications towers. The location component 814 may be further configured to store a user-defined location in main memory 804 or static memory 806. In some embodiments, a mobile location enabled application may work in conjunction with the location component 814 and the network interface device 820 to transmit the location of the computer system 800 to an application server or third party server for the purpose of identifying the location of a user operating the computer system 800.

In some embodiments, the network interface device 820 may correspond to a transceiver and antenna. The transceiver may be configured to both transmit and receive cellular network signals, wireless data signals, or other types of signals via the antenna, depending on the nature of the computer system 800.

Machine-Readable Medium

The drive unit 816 includes a machine-readable medium 822 on which is stored one or more sets of data structures and instructions 824 (e.g., software) embodying or used by any one or more of the methodologies or functions described herein. The instructions 824 may also reside, completely or at least partially, within the main memory 804, the static memory 806, and/or the processor 802 during execution thereof by the computer system 800, with the main memory 804, the static memory 806, and the processor 802 also constituting machine-readable media.

Consistent with some embodiments, the instructions 824 may relate to the operations of an operating system (OS). Depending on the particular type of the computer system 800, the OS may, for example, be the iOS® operating system, the Android® operating system, a BlackBerry® operating system, the Microsoft® Windows® Phone operating system, Symbian® OS, or webOS®. Further, the instructions 824 may relate to operations performed by applications (commonly known as "apps"), consistent with some embodiments. One example of such an application is a mobile browser application that displays content, such as a web page or a user interface using a browser.

While the machine-readable medium 822 is shown in an example embodiment to be a single medium, the term "machine-readable medium" may include a single medium or multiple media (e.g., a centralized or distributed database, and/or associated caches and servers) that store the one or more data structures or instructions 824. The term "machine-readable medium" shall also be taken to include any tangible medium that is capable of storing, encoding, or carrying instructions (e.g., instructions 824) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 824 may further be transmitted or received over a network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, plain old telephone service (POTS) networks, and wireless data networks (e.g., WiFi and WiMax networks). The term "transmission medium" shall be taken to include any intangible medium that is capable of storing, encoding, or carrying the instructions 824 for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
   accessing a database query statement, the database query statement being an executable instruction expressing an action to be performed with respect to a database;
   generating, using one or more processors, an abstract syntax tree (AST) corresponding to the database query statement, the AST being a data structure representing a syntactic structure of the database query statement;
   generating a domain model using the AST, the domain model describing elements of the database query statement and roles and relationships of each element;
   generating a graphical model of the database query statement using the domain model, the graphical model being a graphical representation of the structure of the database query statement; and
   causing presentation of the graphical model of the database query statement on a client device.

2. The method of claim 1, further comprising:
   receiving a user edit to the graphical representation of the structure of database query statement; and
   in response to receiving the user edit to the graphical representation of the structure of the database query statement, updating the database query statement in accordance with the user edit to the graphical representation of the structure of the database query statement.

3. The method of claim 1, further comprising:
   identifying an error in the database query statement; and
   in response to identifying the error, causing the client device to present a suggestion for correcting the error.

4. The method of claim 3, further comprising:
   identifying at least one element in the graphical model of the database query statement corresponding to the error; and
   causing the identified at least one element in the graphical model to be visually distinguished from remaining elements in the graphical model.

5. The method of claim 1, further comprising:
   analyzing the database query statement;
   generating a suggestion to optimize the database query statement based on the analyzing of the database query statement; and
   causing the client device to present the suggestion to optimize the database query statement.

6. The method of claim 1, wherein the database query statement is included in a source object, and wherein the accessing of the database query statement includes accessing the source object.

7. The method of claim 1, wherein the generating of the AST includes parsing the database query statement to identify the syntactic structure.

8. The method of claim 1, wherein the generating of the domain model includes modifying the AST to include additional attributes.

9. The method of claim 1, wherein the domain model is generated to conform to Eclipse Modeling Framework (EMF).

10. The method of claim 1, wherein the domain model is an Extensible Markup Language (XML) model.

11. The method of claim 1, wherein the database query statement is an OpenSQL query.

12. A system comprising:
    a machine-readable medium storing a source object, the source object including a database query statement, the database query statement being an executable instruction expressing an action to be performed with respect to a database;
    a parser, comprising at least one processor, configured to access and parse the database query statement to generate a corresponding abstract syntax tree (AST), the AST being a data structure representing a syntactic structure of the database query statement;
    a generation module configured to generate a domain model using the AST, the domain model describing roles and relationships of each element in the database query statement;
    a modeling engine configured to generate a graphical model of the database query statement using the domain model, the graphical model being a graphical representation of the database query statement, the modeling engine further to cause presentation of the graphical model.

13. The system of claim 12, further comprising an editor module configured to perform operations comprising:
    receiving user input specifying an edit to the graphical model;
    updating the graphical model based on the user input;
    converting the updated graphical model to an updated database query statement; and
    causing presentation of updated database query statement.

14. The system of claim 13, wherein the editor module is further configured to replace the database query statement in the source object with the updated database query statement.

15. The system of claim 12, further comprising a validation module configured to validate syntax of the database query statement.

16. The system of claim 12, further comprising a suggestion module configured to provide a suggestion to improve the database query statement based on results of a syntax validation of the database query statement.

17. The system of claim 12, wherein the generating of the graphical model performed by the modeling engine includes mapping the AST to a particular modeling framework.

18. A non-transitory tangible computer-readable storage medium including instructions that, when executed by at least one processor of a machine, cause the machine to perform operations comprising:
- accessing a database query statement, the database query statement being an executable instruction expressing an action to be performed with respect to a database;
- generating an abstract syntax tree (AST) corresponding to the database query statement, the AST being a data structure representing a syntactic structure of the database query statement;
- generating a domain model by modifying the AST to include one or more additional attributes, the domain model describing the elements of the database query statement and the roles and relationships of each element;
- generating a graphical model of the database query statement using the domain model, the graphical model being a graphical representation of the database query statement; and
- causing presentation of the graphical model of the database query statement on a client device.

19. The method of claim 2, wherein the modifying of the database query statement in accordance with the user edit comprises:
- translating the graphical model to an Extensible Markup Language (XML) model; and
- converting the XML model to an updated database query statement.

\* \* \* \* \*